Sept. 26, 1961  H. POREPP  3,001,904
METHOD OF MAKING SLIDING CLASP FASTENERS
Filed Jan. 13, 1959
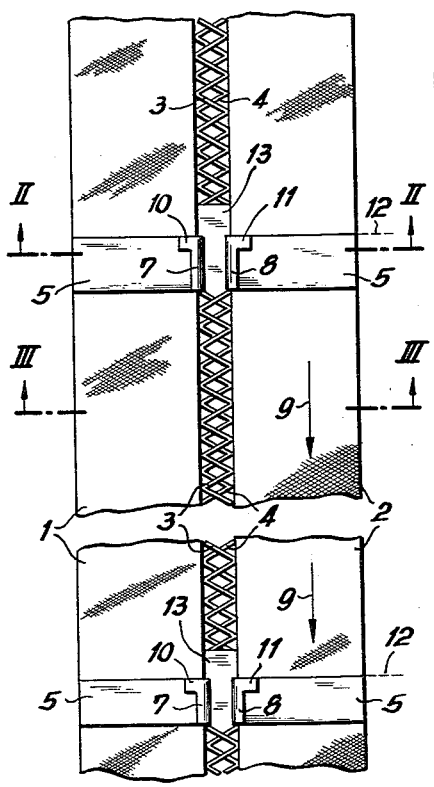
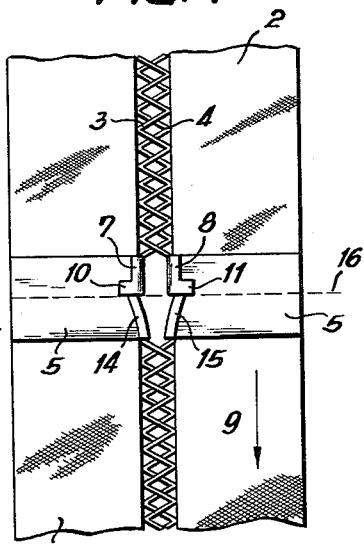
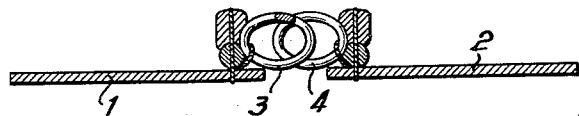
INVENTOR:
HANS POREPP
By Richardson, Davis and Nordon
Atty's United States Patent Office
3,001,904
Patented Sept. 26, 1961

3,001,904
METHOD OF MAKING SLIDING CLASP FASTENERS
Hans Porepp, Essen-Bredeney, Germany, assignor to Opti-Holding A.G., Glarus, Switzerland
Filed Jan. 13, 1959, Ser. No. 786,567
Claims priority, application Germany Feb. 10, 1958
6 Claims. (Cl. 156—66)

The present invention relates to a method for manufacturing sliding clasp fasteners made of two endless stringer tapes having each a continuous so-called toothed bar or toothed edge made of a molecularly orientable plastic material, which are brought into mutual engagement. Such toothed bars may for example be helically wound or helically displaced from polyamide threads and be bent in U-shape manner about the median longitudinal line, the stretched material effecting the attachment by profiling, flattening or the like. The toothed bars may however also be molecularly oriented by a shaping pressure which is exerted on a plastic thread, and at the same time provided with attachment elements.

In all sliding clasp fasteners as hitherto constructed the two fastener stringer tapes or textile stringer tapes have extended at both ends beyond the toothed bars or member rows, for example by approximately 2 to 3 cm., and these ends have had to be turned down in order to avoid fraying when sewing the fastener in a garment or the like and in order to obtain a good closing of the fastener. Furthermore, the two fastener chains have had to be provided with separate end stops which constitute a stop member for the slider of the fastener.

The present invention provides a simple method of avoiding fraying of the ends of the textile stringer tapes by welding thermoplastic foils on or in the tapes.

According to the method of the present invention, strips of a thermoplastic material are welded on the two engaged fastener chains, which may be fed from a drum or the like, at distances corresponding to the desired fastener length, either on one side or advantageously on both sides and transverse to the longitudinal direction of the fastener, said strip material being welded by pressure and heat to the two toothed rows in such a manner that a longitudinal directed separating portion is formed centrally between the two toothed rows, and each toothed row forms with the two strips a longitudinally directed bead on the internal edge of the textile stringer tape, which is widened outwardly at the edge of the strips remote from the direction of advance in order to form a stop member, the two chains being completely separated in a transverse direction. In this manner fraying of the start of the two textile stringer tapes of the fastener is prevented and, by the shaping weld of the transverse strips, the end stops of the fastener are simultaneously made, said end stops limiting the slider movement. The slider, after separation or opening of the two fastener chains is slid on from the other end whilst simultaneously making engagement with the toothed bars. This end is then closed in a simple manner by means of a transverse seam, it being possible for the transverse seam to effect at the same time the joining with the garment or the like. By means of this method according to the invention it is possible to manufacture sliding clasp fasteners or sliding clasp fastener chains without waste. It should be noted in particular that hitherto in the manufacture of such fasteners it has also been necessary to remove the toothed bar from the two protruding textile stringer tape ends, since initially the endless textile stringer tapes had to be provided with endless toothed bars for manufacturing reasons.

Finally it is also possible according to the invention to shape the toothed bars with the narrow transverse strips in such a manner that they assume the shape of plugs, as is necessary with completely separable fasteners, one plug being then connected to a case part, in which the other plug may be inserted, in a known manner, in the longitudinal direction of the fastener.

The method according to the invention will now be further described with reference to the accompanying drawings, in which:

FIGURE 1 shows a plan view of two sliding clasp fastener chains brought into engagement, having narrow transverse strips of thermoplastic material welded on and shaped, FIGURE 2 shows an enlarged transverse section along the line II—II of FIGURE 1, FIGURE 3 shows an enlarged transverse section along the line III—III of FIGURE 1, FIGURE 4 shows a plan view of a modified embodiment.

Referring to FIGURES 1 to 3, two endless stringer tapes 1 and 2 are each provided with an endless toothed bar 3, 4 made of a molecularly oriented plastic material, for example a polyamide, polyurethane or the like. The toothed bars may have any desired construction, but in this embodiment they consist of helically wound profiled polyamide threads which are sewn in a known manner to the textile stringer tapes 1 and 2. The two fastener chains 1, 3 and 2, 4 are brought into mutual engagement and wound on a drum or the like.

In order to make individual sliding clasp fasteners of the desired length, the two fastener chains which are in engagement are run-off from the drum and are covered, at points spaced according to the fastener lengths desired, either on one side or on both sides, with narrow strips 5 and 6 made of a thermoplastic foil and extending transversely of the stringer tapes. Said strips are first joined to the textile stringer tapes 1 and 2 by means of a light pressure and heat. Thereafter, either at the same place or after a further run of the fasteners chains by a distance corresponding to one fastener length there occurs a shaping pressure with the application of heat, by means of which the two strips 5 and 6 are permanently welded to the two stringer tapes 1 and 2 and by means of which at the same time the two toothed bars 3 and 4 are welded to the thermoplastic strips 5 and 6. This is effected in such a manner that in the first instance a separation and additionally a shaping is caused centrally between the two fastener chains in the longitudinal direction over the width of the strips 5, 6, by means of which a bead-like thickening 7, 8 occurs on the two facing stringer tape edges, which is widened outwardly at the edge furthest away from the direction of advance 9 of the narrow thermoplastic strips 5,6. These widened parts 10 and 11 constitute the end stops of a fastener, when the endless chains have been completely separated in the transverse direction along the line 12, so that these end stops prevent the slider from sliding off the fastener chains.

For carrying out the shaping and welding process, a pair of welding dies is employed, the facing surfaces of which having a profile corresponding to the desired shaping of the beads 7, 8 and of the widened parts 10, 11. Furthermore these dies are advantageously constructed in such a manner that a small piece of the toothed bars which extends along the line 12 is also welded down at 13. Then the material of this welded down area 13 as well as the material remaining between the beads 7 and 8 is punched out and the complete transverse separation of the fastener chains is only subsequently effected along the line 12. Thereupon the two engaging chains of the manufactured fastener having the desired length are separated from one another or opened and now a slider may be slid on the two chains, the punched out part 13 of the toothed bars facilitating the placing on of the slider or may even be an essential initial requirement in order to render it possible to position the slider in the chains. After the slider has been placed on chains, the two textile stringer tapes 1 and 2 are joined together at the fastener end, at or adjacent the level of the area 13, by means of a transverse seam in such a manner that an end part is no longer necessary. It is however also possible to proceed in such a manner that this transverse seam is produced when sewing the fastener in a garment. In the case of large scale users of sliding clasp fasteners it is of course possible to supply continuous sliding clasp fasteners in such a manner that the separation of the endless strip into individual fastener lengths along the line 12 is first effected by the user who then also places the slider on the chains.

The method according to the invention may also be used in manufacturing completely separable sliding clasp fasteners of the type in question. In this connection the method used is shown in FIGURE 4, and consists in that the transverse strip 5, 6 made of thermoplastic material to be welded on one side or on both sides is chosen somewhat wider than in the case of FIGURE 1. A shaping weld is again effected in such a manner that the toothed bars 3 and 4 of the two engaged fastener chains form, with the two transverse strips on the facing stringer tape edges, two plugs 14 and 15 on to which are attached, counter to the direction of advance, the widened parts 10 and 11, with the two longitudinally extending beads 7 and 8, serving as end stops as described in FIGURE 1. Then the thin material which remains between the plugs 14 and 15 and the beads 7 and 8 is punched out and finally the separation of the individual fastener lengths is effected on the transverse line 16 in such a manner that the plugs 14, 15 form the end, and the beads 7, 8 with the widened parts 10, 11 form the beginning of two successive fastener lengths. After placing a slider on the chains, one of the plugs 14 or 15 is connected in any suitable manner to a plug case, into which the other plug is inserted in a detachable manner as is known in the art for producing a completely separable sliding clasp fastener.

Finally it should be stated that the transverse strips 5 and 6 must not constitute a hinderance for sewing the fastener stringer tapes 1 and 2 on to a garment, so that the material of these strips must be sufficiently soft that it is possible to sew through them.

Whilst particular embodiments have been described it will be understood that various modifications may be made without departing from the scope of this invention as defined in the claims.

I claim:

1. A method for manufacturing sliding clasp fasteners haivng two fastener stringer tapes which are each provided with a row of teeth made of a molecularly orientable plastic material and which are adapted to be brought into engageemnt by means of a slider, wherein strips of a thermoplastic material are welded on to at least one side of the two engaged fastener chains at distances corresponding to the desired fastener lengths, said strips extending transversely to the longitudinal direction of the fastener, next heat and pressure molding the strips and rows of teeth therebetween to form a longitudinally directed separating portion centrally between the two toothed rows and a longitudinally directed bead on the internal edge of the textile stringer tape which is widened outwardly at the edge of the strips remote from the direction of advance in order to form a stop member, and finally transversely severing the tapes adjacent the stop members.

2. A method according to claim 1, in which a short portion of the toothed rows attached on the side opposite the direction of advance is flattened by heat and pressure, which flattened portion subsequently, before the transverse complete separation of the fastener chains, is punched out together with the part remaining between the two beads.

3. A method according to claim 1, in which the two fastener chains are completely separated in the transverse direction in the longitudinal zone of the beads in the direction of advance but before the widened parts forming the stops in such a manner that the beads in the form of plugs allow the construction of a fully separable fastener, and each welded zone constitutes the end of one fastener and the end stops at the beginning of the next fastener.

4. A method for manufacturing sliding clasp fasteners having two fastener stringer tapes which are each provided with a toothed row made of a molecularly orientable plastic material and which are adapted to be brought into engagement by means of a slider, wherein strips of a thermoplastic material are welded on to both sides of the two engaged fastener chains at distances corresponding to the desired fastener lengths, said strips extending transversely to the longitudinal direction of the fastener and being welded to the two toothed rows by pressure and heat in such a manner that a longitudinally directed separating portion is formed centrally between the two toothed rows, and each toothed row forming with the two strips a longitudinally directed bead on the internal edge of the textile stringer tape which is widened outwardly at the edge of the strips remote from the direction of advance in order to form a stop member the two chains being thereafter completely separated in a transverse direction.

5. A method according to claim 4, in which simultaneously with the manufacture of the two beads serving as end stops a short piece of the toothed rows on the side opposite the direction of advance is welded down, which subsequently before the transverse complete separation of the fastener chains is punched out together with the part remaining between the two beads.

6. A method according to claim 4, in which the two fastener chains are completely separated in the transverse direction in the longitudinal zone of the beads in the direction of advance but before the widened parts forming the stops, in such a manner that the beads in the form of plugs allow the construction of a fully separable fastener, and each welded zone constitutes the end of one fastener and the end stops at the beginning of the next fastener.

References Cited in the file of this patent

UNITED STATES PATENTS

| | | |
|---|---|---|
| 2,095,209 | Brownsdon | Oct. 5, 1937 |
| 2,274,722 | Marinsky | Mar. 3, 1942 |
| 2,438,615 | Morin | Mar. 20, 1948 |
| 2,582,456 | Poux | Jan. 15, 1952 |